United States Patent
Kurata et al.

(10) Patent No.: US 9,514,524 B2
(45) Date of Patent: Dec. 6, 2016

(54) OPTICAL DISTORTION COMPENSATION

(71) Applicant: SONY CORPORATION, Tokyo (JP)

(72) Inventors: Tohru Kurata, Tokyo (JP); Satoshi Numata, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 103 days.

(21) Appl. No.: 14/634,233

(22) Filed: Feb. 27, 2015

(65) Prior Publication Data

US 2016/0253791 A1 Sep. 1, 2016

(51) Int. Cl.
| | |
|---|---|
| G06T 5/00 | (2006.01) |
| G06T 3/00 | (2006.01) |
| H04N 5/357 | (2011.01) |
| G06K 9/00 | (2006.01) |
| G06K 9/46 | (2006.01) |
| H04N 5/217 | (2011.01) |
| H04N 5/232 | (2006.01) |

(52) U.S. Cl.
CPC ........... *G06T 5/006* (2013.01); *G06K 9/00248* (2013.01); *G06K 9/46* (2013.01); *G06T 3/0093* (2013.01); *H04N 5/217* (2013.01); *H04N 5/23219* (2013.01); *H04N 5/3572* (2013.01)

(58) Field of Classification Search
None
See application file for complete search history.

(56) References Cited

U.S. PATENT DOCUMENTS

| | | | | |
|---|---|---|---|---|
| 8,023,009 B2* | 9/2011 | Cho | ....................... | H04N 5/217 348/222.1 |
| 8,149,280 B2* | 4/2012 | Yoda | ................... | H04N 5/23219 348/207.1 |
| 8,248,508 B2* | 8/2012 | Murata | ................... | G06T 5/006 348/239 |
| 8,466,989 B2* | 6/2013 | Oshita | ................ | H04N 5/23219 348/222.1 |
| 8,515,130 B2* | 8/2013 | Aragane | ................... | H04N 7/15 348/14.08 |
| 8,599,238 B2* | 12/2013 | Wu | ..................... | G06K 9/00228 348/14.02 |
| 8,773,543 B2* | 7/2014 | Alakarhu | ........... | H04N 5/23241 348/14.01 |
| 8,913,173 B2* | 12/2014 | Onomura | .............. | G06T 3/0062 348/333.12 |
| 9,001,181 B2* | 4/2015 | Yamashita | ............... | H04N 7/15 340/541 |

(Continued)

FOREIGN PATENT DOCUMENTS

JP      2009-145991      7/2009

*Primary Examiner* — Michael Osinski
(74) *Attorney, Agent, or Firm* — Oblon, McClelland, Maier & Neustadt, L.L.P.

(57) ABSTRACT

Embodiments include systems and methods for an electronic device, which includes circuitry configured to detect a size of a face from a captured image. The circuitry is also configured to identify a distortion correction parameter which varies according to a size of the detected face. The circuitry is also configured to correct a distortion of the face within the captured image by utilizing the distortion correction parameter identified based on the size of the detected face from the captured image.

17 Claims, 14 Drawing Sheets

(56) References Cited

U.S. PATENT DOCUMENTS

| | | | | |
|---|---|---|---|---|
| 9,042,609 | B2* | 5/2015 | Todoroki | G06K 9/00288 |
| | | | | 382/118 |
| 9,049,355 | B2* | 6/2015 | Lin | H04N 5/217 |
| 2008/0239107 | A1* | 10/2008 | Cho | H04N 5/217 |
| | | | | 348/241 |
| 2009/0207266 | A1* | 8/2009 | Yoda | H04N 5/23219 |
| | | | | 348/222.1 |
| 2009/0262231 | A1* | 10/2009 | Murata | G06T 5/006 |
| | | | | 348/335 |
| 2010/0265365 | A1* | 10/2010 | Oshita | H04N 5/23219 |
| | | | | 348/241 |
| 2011/0090303 | A1* | 4/2011 | Wu | G06K 9/00228 |
| | | | | 348/14.16 |
| 2011/0109774 | A1* | 5/2011 | Onomura | G06T 3/0062 |
| | | | | 348/241 |
| 2012/0093365 | A1* | 4/2012 | Aragane | H04N 7/15 |
| | | | | 382/103 |
| 2013/0265383 | A1* | 10/2013 | Yamashita | H04N 7/15 |
| | | | | 348/14.08 |
| 2014/0085514 | A1* | 3/2014 | Lin | H04N 5/2628 |
| | | | | 348/241 |
| 2014/0169643 | A1* | 6/2014 | Todoroki | G06K 9/00288 |
| | | | | 382/118 |
| 2014/0267824 | A1* | 9/2014 | Alakarhu | H04N 5/23241 |
| | | | | 348/222.1 |
| 2015/0086132 | A1* | 3/2015 | Tsukagoshi | H04N 5/3572 |
| | | | | 382/275 |
| 2016/0071250 | A1* | 3/2016 | Tsukagoshi | G06T 5/006 |
| | | | | 382/275 |

* cited by examiner

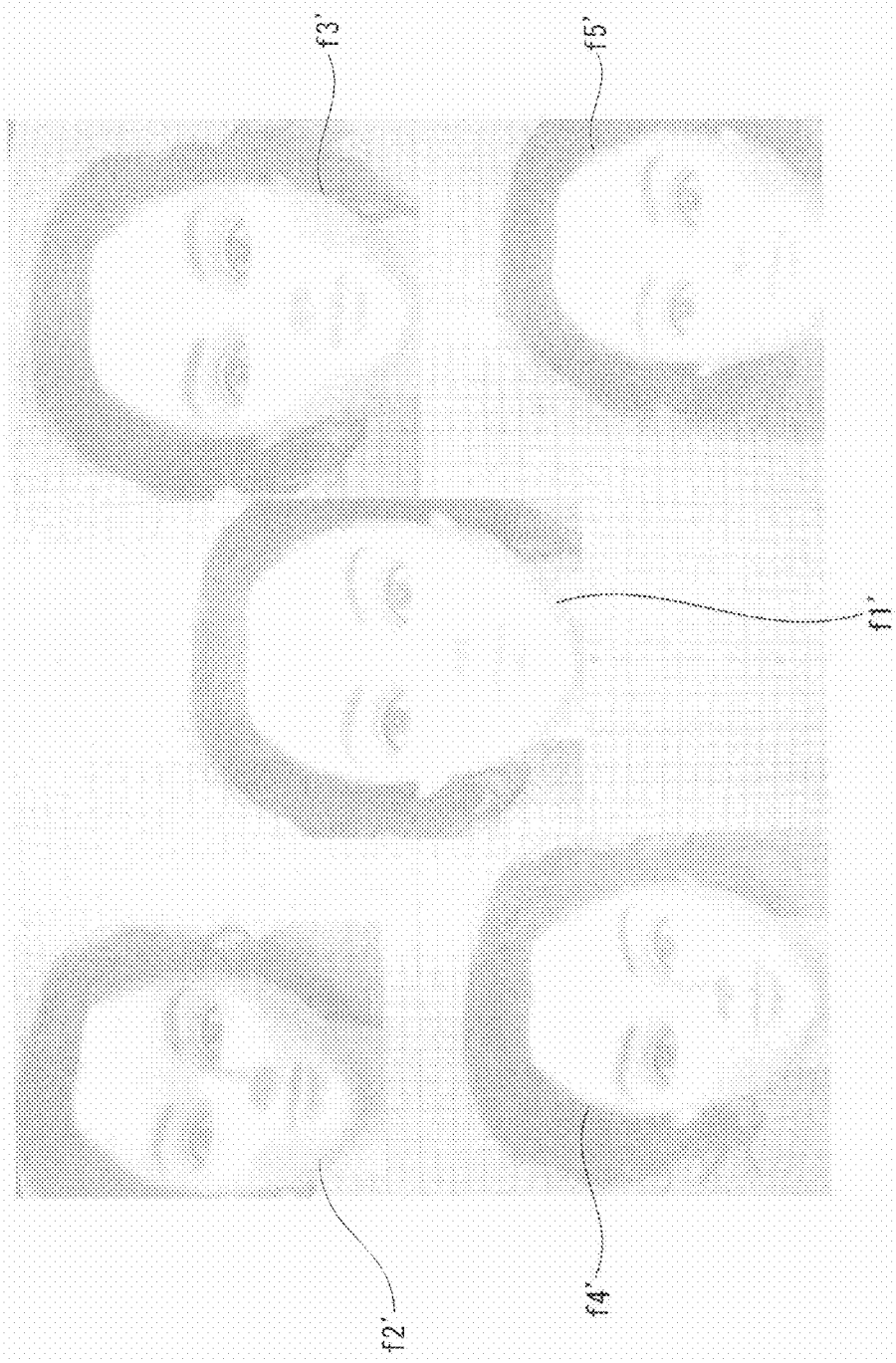

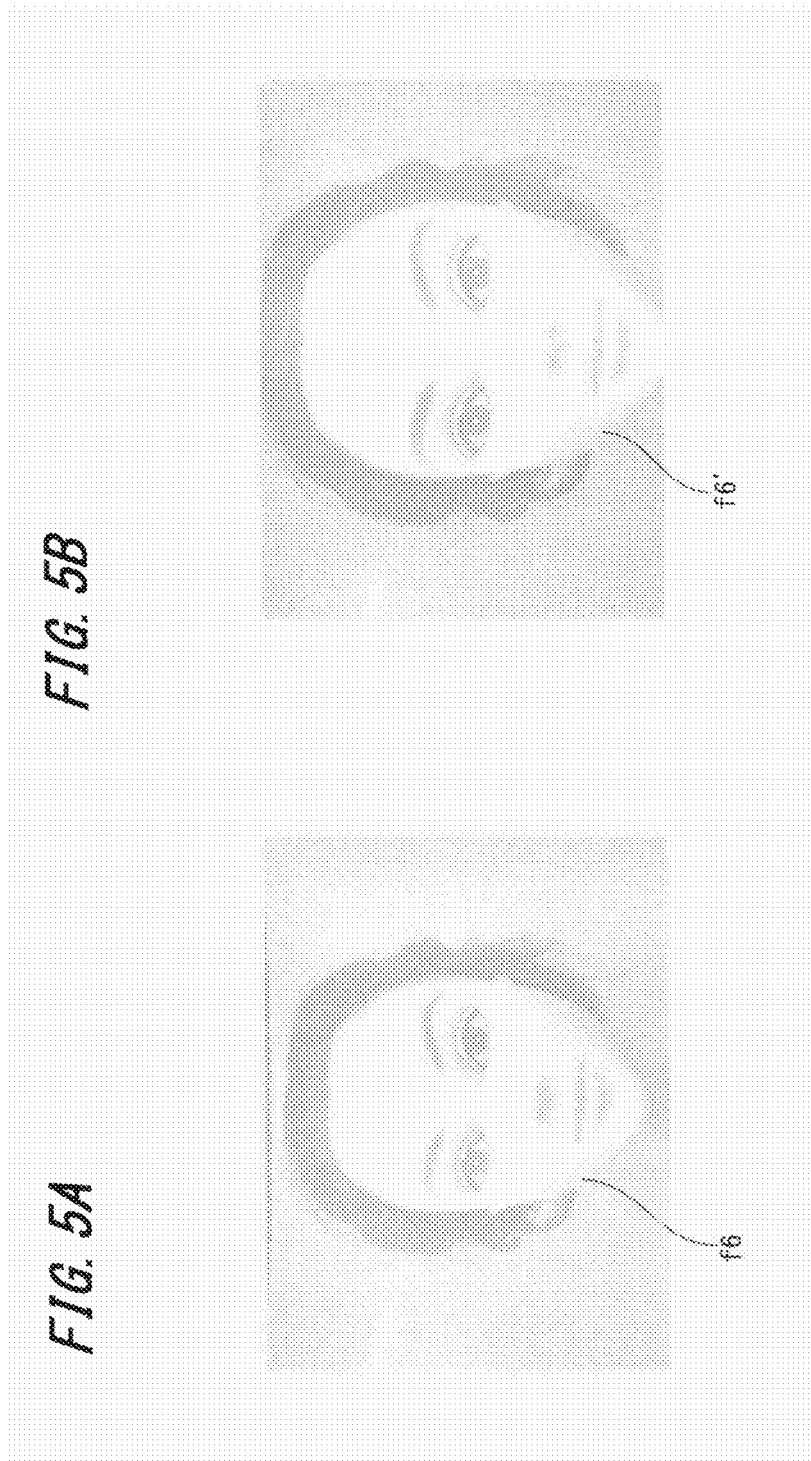

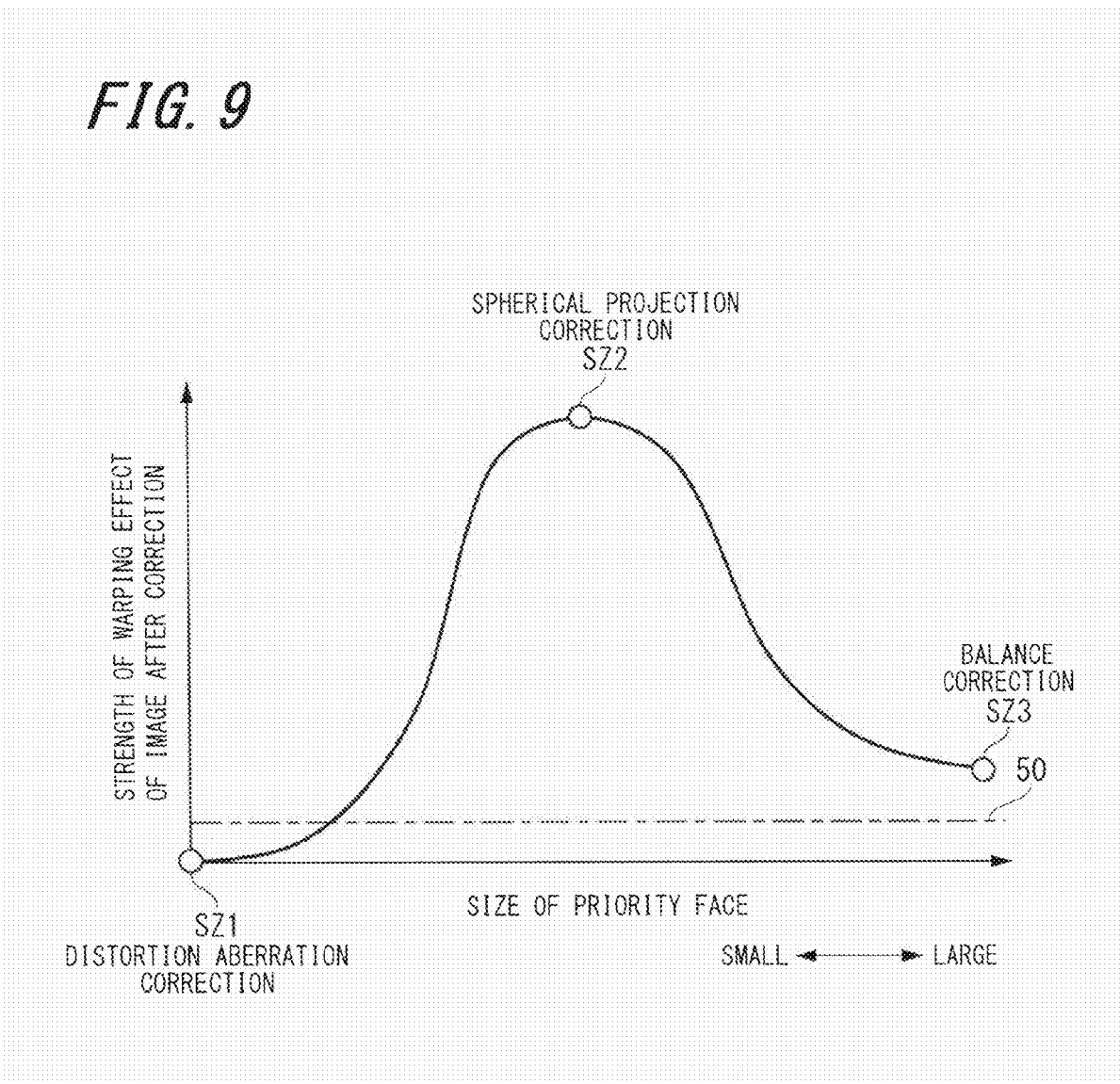

OPTICAL DISTORTION COMPENSATION

BACKGROUND OF THE INVENTION

Field of the Invention

Devices, systems, and methods for optical distortion compensation are described. In particular, an electronic system captures an image, applies distortion correction parameters, and outputs an adjusted image.

Description of the Related Art

When an image is captured from a position directly facing the object, there is little distortion and the photographed object appears nearly normal. However, when an image is not captured directly facing the object, the photographed object will appear distorted, depending upon the view from the image-capturing device. For example, when an image is captured from an image-capturing device directed upwards, the base of the photographed image appears larger than an upper portion of the image. When an image is captured from the left side of the object, the photographed object appears to lean towards the left. Likewise, when an image is captured from the right side of the object, the photographed object appears to lean towards the right.

SUMMARY OF THE INVENTION

Embodiments include an electronic device, which includes circuitry configured to detect a size of a face from a captured image. The circuitry is also configured to identify a distortion correction parameter which varies according to a size of the detected face. The circuitry is also configured to correct a distortion of the face within the captured image by utilizing the distortion correction parameter identified based on the size of the detected face from the captured image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates images of a face after distortion compensation features were implemented according to an embodiment;

FIG. 5A illustrates a facial image before any distortion adjustment is made according to an embodiment;

FIG. 5B illustrates a compensated facial image in which central features of the face have been enlarged according to an embodiment;

FIG. 9 is a graph illustrating a correction parameter according to an embodiment;

Referring now to the drawings, wherein like reference numerals designate identical or corresponding parts throughout the several views.

DETAILED DESCRIPTION OF THE PREFERRED EMBODIMENTS

Embodiments herein describe image correction systems and methods, which are applied to user devices. Wide-angle distortion occurs frequently with images taken with a wide-angle lens of a camera device. A photographed image has a greater tendency to appear distorted to some degree when the image is captured by the wide-angle lens since a large area is being captured. The more distant the image-capturing device is situated from the central position of the image, the greater the distortion.

Figure 1A:
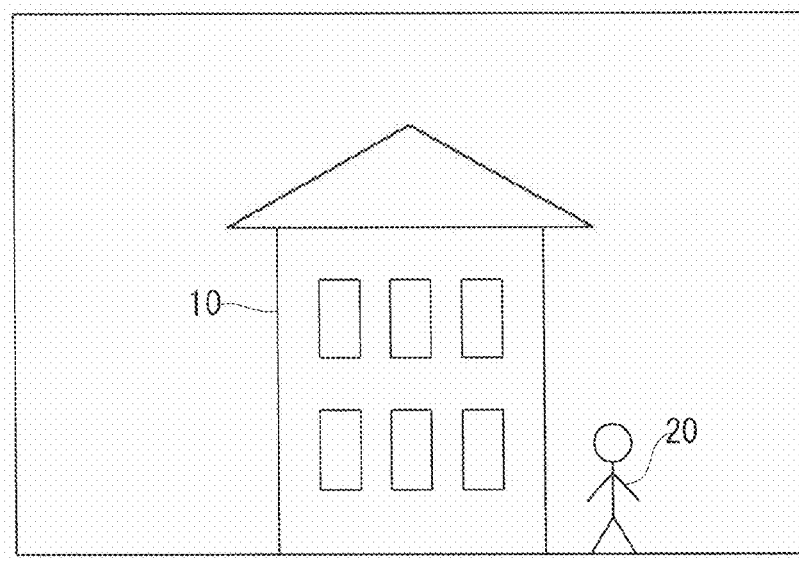
FIG. 1A illustrates an image of a house and a person with no image distortion according to an embodiment.

FIG. 1A illustrates an image of a house 10 (or other building) and a person 20 standing next to house 10. The image of house 10 and person 20 was captured when the camera or other image-capturing device was situated directly in front of the image and close to the same height as the image. Therefore there is little distortion of the captured image.

Figure 1B:
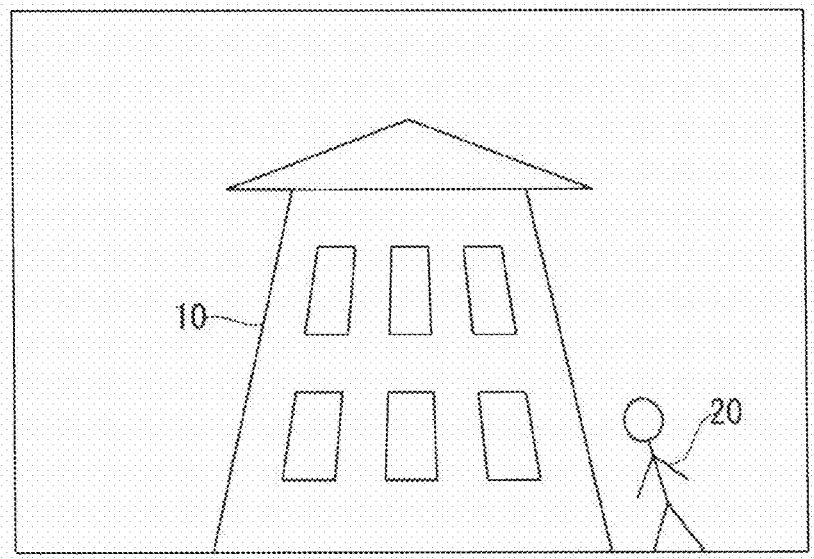
FIG. 1B illustrates an image of a house and a person with image distortion according to an embodiment.

FIG. 1B illustrates a captured image when the image-capturing device is directed upwards towards the image. As a result, house 10 appears gradually smaller with height. In addition, person 20 is leaning towards the left, rather than standing upright, as a result of the image-capturing device capturing the image from the left side of person 20. These distortions are referred to as perspective distortions.

Figure 2:
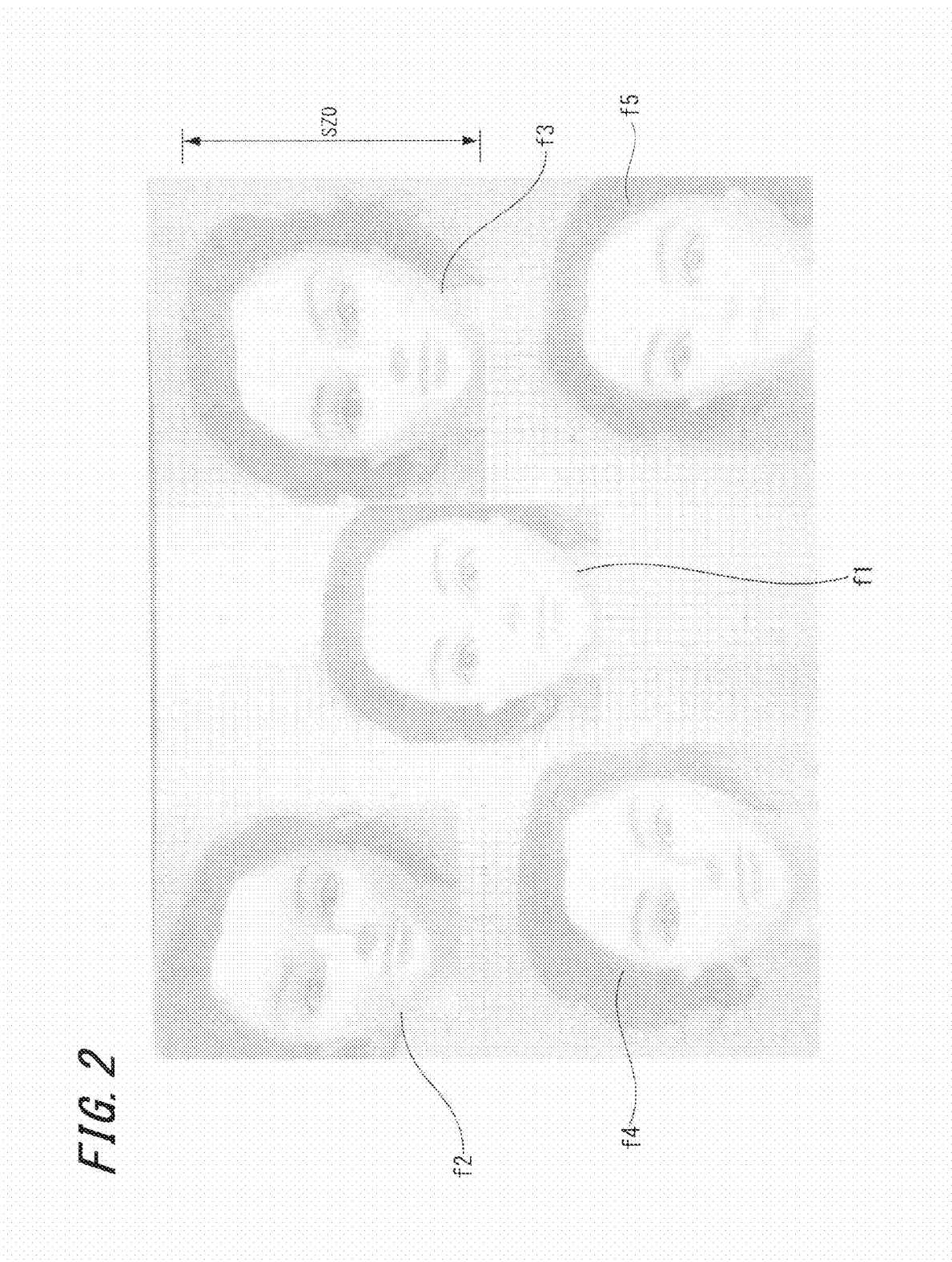
FIG. 2 illustrates images of a face according to an embodiment.

FIG. 2 illustrates images of a face of height SZ0 taken with a wide angle lens of a camera or other image-capturing device. Image f1 was captured directly in front of the person's face, resulting in little distortion. Image f2 was captured with the wide-angle lens of an image-capturing device directed upwards and to the left. Image f3 was captured with the wide-angle lens directed upwards and to the right. Image f4 was captured with the wide-angle lens directed downwards and to the left. Image f5 was captured with the wide-angle lens directed downwards and to the right.

Images f2-f5 display asymmetry of the face in a vertical left-to-right or right-to-left plane. In addition, there is also horizontal asymmetry, which causes the appearance of the eyes to be non-identical in appearance.

Figure 3A:
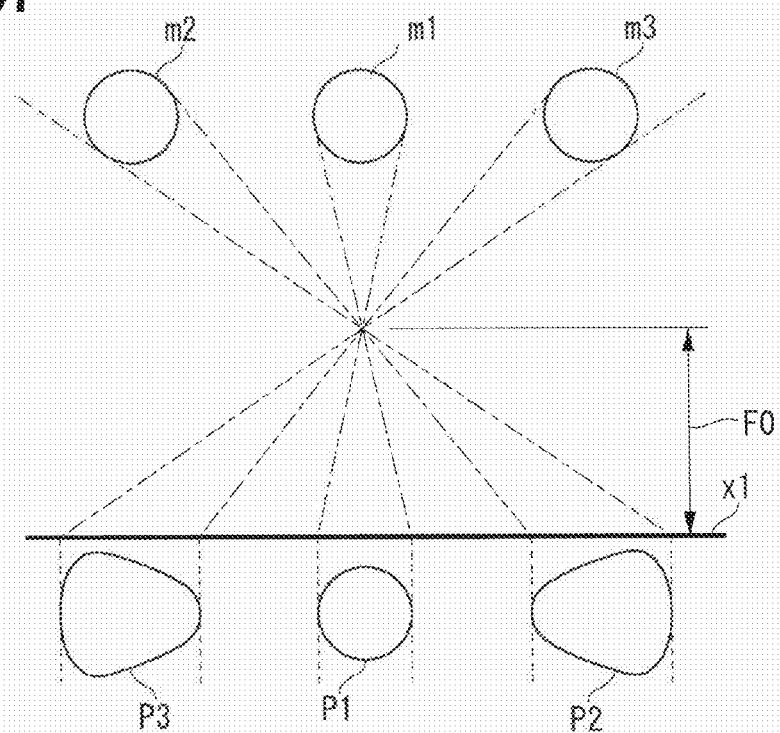
FIG. 3A illustrates the principle by which distortion is generated according to an embodiment.

FIG. 3A illustrates the principle by which distortion is generated for a round image, such as a face. Three circular objects m1, m2, and m3 are taken with an image-capturing device having an optical lens with a focal distance of F0. No distortion correction is made when the image is taken at an imaging surface of a projected plane, x1. The center object m1 has been captured as image P1, wherein the captured image P1 has little or no distortion. However, captured image P2 does not retain its original circular shape, but is captured as a non-circular oval shape in which the image expands in size to the right as it becomes more distant from the image-capturing position. Likewise, P3 does not retain its original circular shape, but is captured as a non-circular oval shape in which the image expands in size to the left as it becomes more distant from the image-capturing position.

FIG. 3A illustrates that an extended line from both sides of object m1 traverses the projected plane x1 at approximately equal lengths from a central focal point. However, extended lines from object m2 result in unequal line lengths from the central focal point. The shorter extended line results in a shrunken portion of the image (left side) and the longer extended line results in an expanded portion of the image (right side). Likewise, the unequal extended lines from the central focal point of object m3 illustrate the shorter extended line results in a shrunken portion of the image (right side) and the longer extended line results in an expanded portion of the image (left side).

Figure 3B:
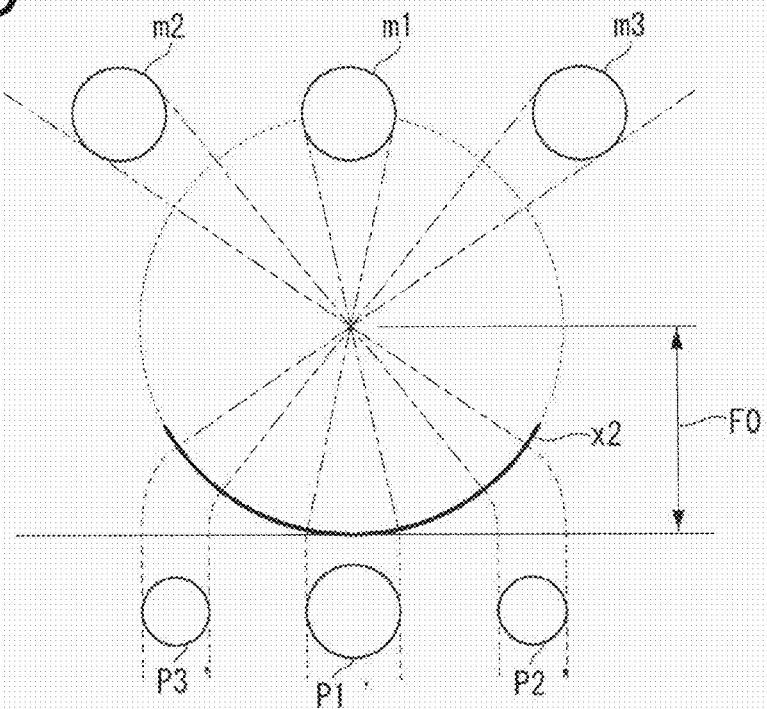
FIG. 3B illustrates a distortion correction mechanism according to an embodiment.

FIG. 3B illustrates a distortion correction mechanism in which a projected plane x2 becomes a spherical form. In so doing, the projected plane x2 corrects the radius F0 to a spherical form of a radius. As a result, objects m1, m2, and m3 are captured as images P1', P2', and P3', respectively, which match the original circular shapes. The following equation can be used in determining distortion image correction.

$$h' = f \arctan(h/f)$$

where h=the coordinate position (image height) of the point before a correction is set, h' is the coordinate position (image height) of the point after a correction is made, and f is the focal distance of a lens. The coordinate position h of the point before a correction is made is moved to compensated position h'. As illustrated in FIG. 3B, the extended lines of all three objects m1, m2, and m3 are of equal length upon reaching the projected plane x2, resulting in minimal distortion of the captured images, P1', P2', and P3', respectively.

FIG. 4 illustrates facial images from FIG. 2 after distortion compensation features described above were implemented. The distortion compensation images f1', f2', f3', f4', and f5' illustrate substantially left-to-right symmetry in each instance. Even though a certain amount of wide-angle distortion is automatically corrected in some image-capturing devices, it is performed under the same conditions and is not customized to the specific images. Therefore the distortion compensation is limited.

FIG. 5A illustrates a facial image f6 before any distortion adjustment is made, and in which the face occupies the majority of the image space. Sometimes, an expression of the face is a desirable feature to emphasize. FIG. 5B illustrates a compensated facial image f6' in which the central features of the face have been enlarged, as evidenced by the background lines that curve outward from the face. When a face occupies a large proportion of the image space, such as FIGS. 5A and 5B, the facial distortion is more apparent. In contrast, when a facial feature occupies a small proportion of the image space, the facial distortion is not as apparent. However, the background within the image of a small facial feature is more pronounced with distortion since the background occupies more of the total image space.

Figure 6:
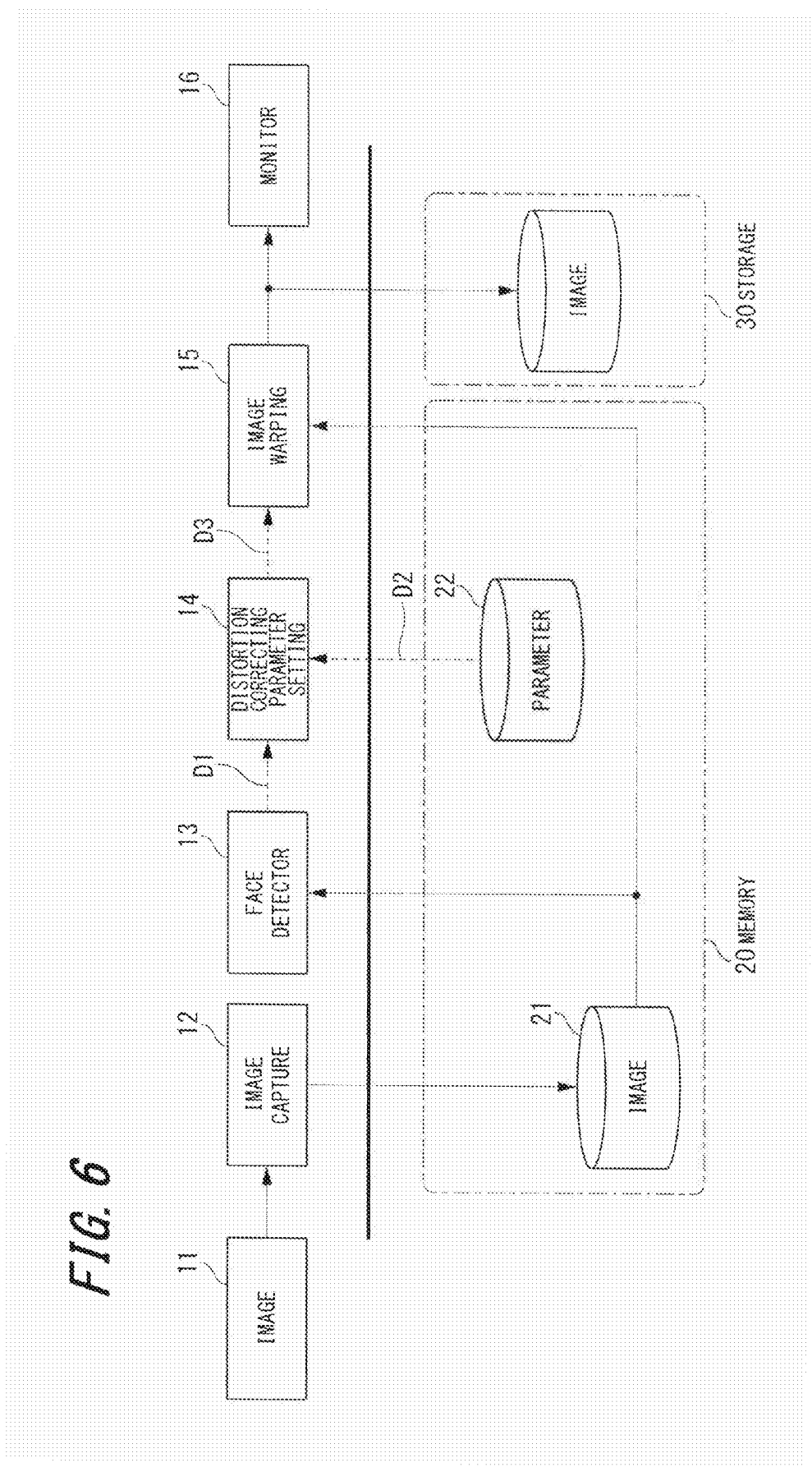
FIG. 6 is a block diagram illustrating an image-capturing device according to an embodiment.
Figure 14:
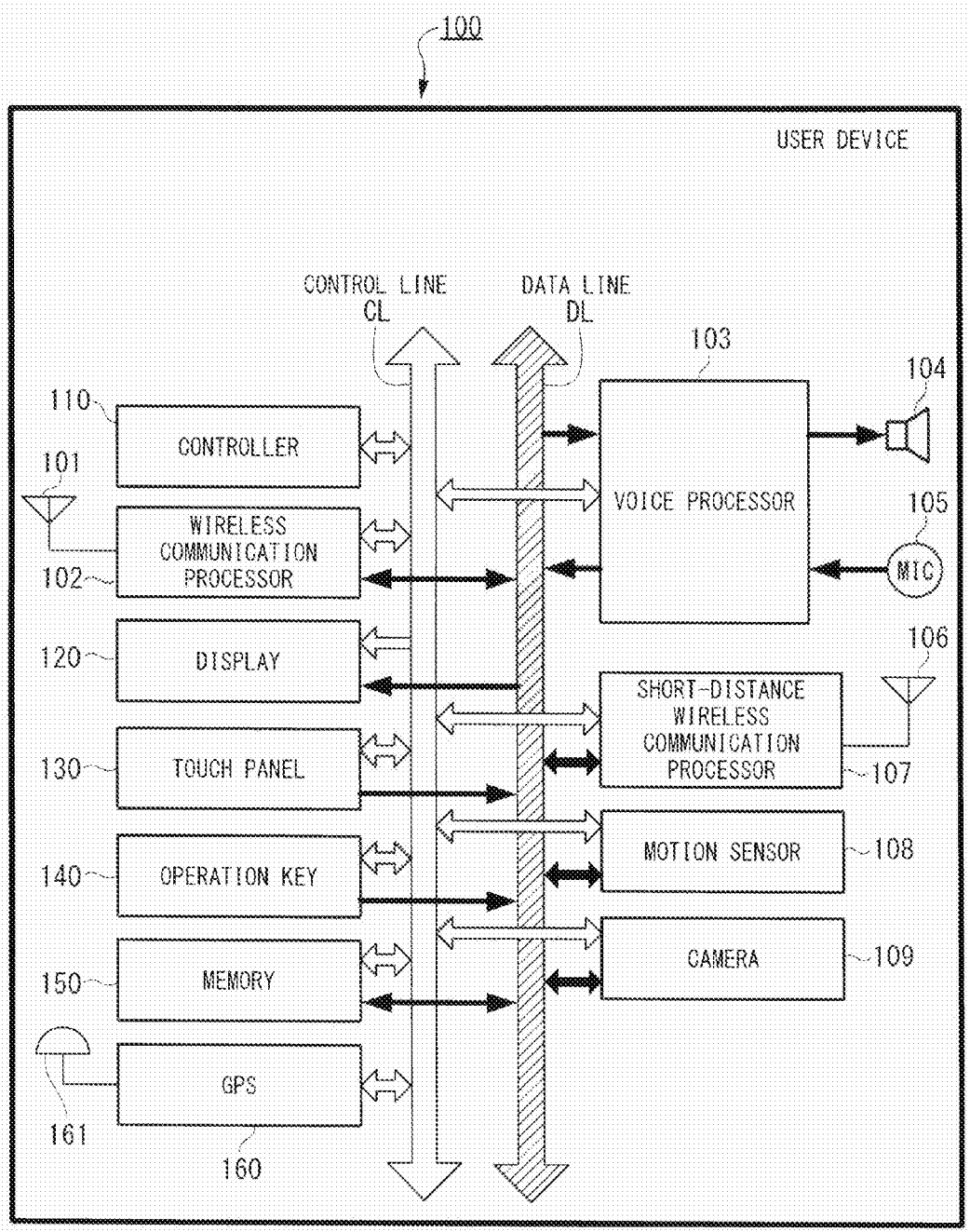
FIG. 14 is a block diagram illustrating an exemplary user device according to an embodiment.

FIG. 6 is a block diagram illustrating a simple overview of an image correction system. Multiple hardware components can be integrated together with the illustrated components of FIG. 6, which are illustrated in FIG. 14. In FIG. 14, a user device 100 includes a controller 110, a wireless communication processor 102 and associated antenna 101, a display 120, a touch panel 130, an operation key 140, memory 150, and GPS 160 and associated antenna 161. These hardware features interact with a voice processor 103 and associated speaker 104 and microphone 105, a short-distance wireless communication processor 107 and associated antenna 106, a motion sensor 108, and a camera 109 through a control line CL and a data line DL. Specific functions of these hardware components will be discussed in more detail with reference to FIG. 14 herein after. Specific hardware components mentioned in embodiments herein could be referencing the same physical hardware component used throughout, or it could be referencing different but similar hardware components being used with one or more other components. In FIG. 6, a continuous line illustrates flow of image data and a broken line illustrates flow of data other than image data.

FIG. 6 is a block diagram illustrating an image component 11, such as an image captured by camera 109 of FIG. 14. Image component 11 can include. an image-capturing device, such as a camera, a video camera, a digital still camera, a smart phone, a tablet device, or any other user device configured to capture still or moving images. Image component 11 includes a photographic lens, such as a wide-angle lens. Image data is captured by an image capture component 12, which is configured by programming and circuitry to capture an image and store it in an image storage component 21 of a memory component 20. Image data stored by image storage component 21 is forwarded to a face detection component 13. Face detection component 13 is configured by programming and circuitry to detect a face within an image from a shape, color tone, or an outline of a face, eye, nose, or mouth, for example. Face detection component 13 can detect the face with a high priority in an image based on pre-determined conditions. When a priority face is determined, face detection component 13 outputs data D1 of a certain size of the priority face.

With continued reference to FIG. 6, memory component 20, such as memory 150 of FIG. 14 includes a parameter storage component 22. The distortion correction parameter for performing distortion correction of an image is stored by parameter storage component 22. A distortion correction parameter D2 is read from parameter storage component 22 and is supplied to a distortion correction parameter setting component 14. Distortion correction parameter setting component 14 is configured by programming and circuitry to modulate a distortion correction parameter based on the size of a priority face. A distortion correction parameter D3 modulated in the distortion correction parameter setting component 14 is supplied to an image warping component 15. The image warping component 15 is configured by programming and circuitry to perform the warping process of the image data stored by the image storage component 21 using the distortion correction parameter supplied from the distortion correction parameter setting component 14.

The warping process of the image warping component 15 corrects the distortion of the face within an image. The distortion correction parameter D3 supplied from the distortion correction parameter setting component 14 is used for the warping process of the image. The image data by which distortion correction is implemented in the image warping component 15 is supplied and displayed on a monitor component 16, such as display 120 illustrated in FIG. 14. In addition, monitor component 16 can also display the image in which no warping correction was implemented by the image warping component 15. The image data by which distortion correction is carried out in the image warping component 15 is supplied to a storage component 30 where it is stored. Image data by which distortion correction is carried out in the image warping component 15 is output (outside of the system illustrated in FIG. 6).

In an alternative embodiment, the recorded image data taken with the camera can be processed using the embodiments described above with reference to FIG. 6. For example, after recording the image data taken with the camera, the application program which performs the image correction process can be mounted in an information processing apparatus, such as a computer device or a smart phone, illustrated as user device 100 in FIG. 14. The image correction process can be performed by execution of the application program. An application program may be recorded on a recording media, such as a semiconductor memory device or an optical disk, for example.

Figure 7:
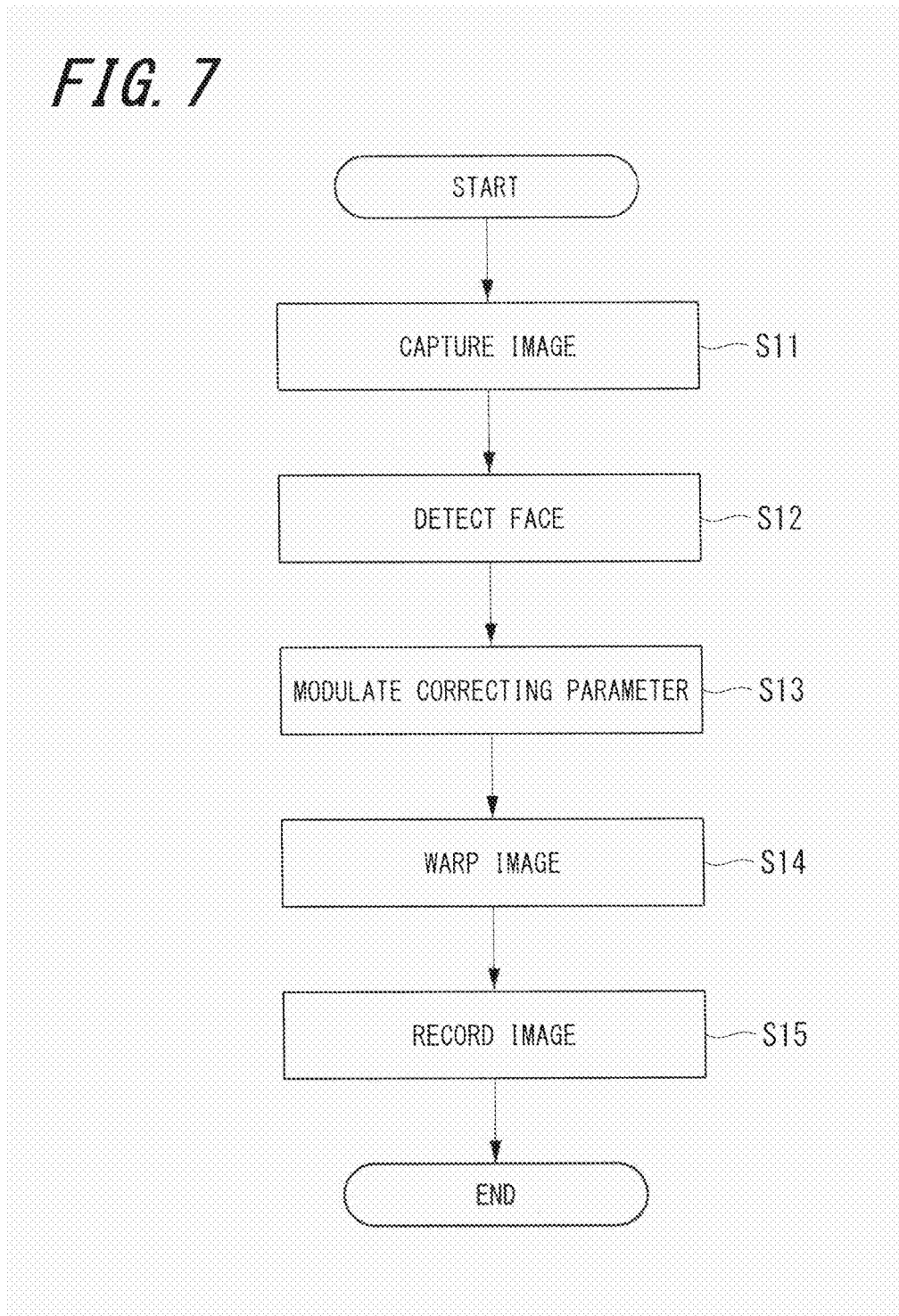
FIG. 7 is an exemplary flowchart of an image correction process according to an embodiment.

FIG. 7 is an exemplary flowchart of an image correction process, which illustrates a distortion correction process for an image. In step S11, the image capture component 12 captures an input image of one frame. In step S12, the face detection component 13 detects a face from an image of one frame stored by memory 20. The face detection component 13 also determines a priority face from the detected one or more faces and detects the size of the priority face.

In step S13, the distortion correction parameter setting component 14 modulates the distortion correction parameter read from parameter storage component 22, which is based on the size of the priority face. In the distortion correction parameter setting component 14, the characteristic curve which determines the modulation state of a distortion correction parameter based on the size of the priority face is preset. The distortion correction parameter setting component 14 obtains the distortion correction parameter of the modulation state corresponding to the distortion strength on a characteristic curve, when the size of the priority face is obtained. A distortion correction parameter is expressed as a curve, which illustrates a relationship of the coordinate position (the "input image height") of the point input to the coordinate position (the "output image height") of the point output, as an example.

In step S14, the image warping component 15 performs distortion correction of an image using the correction parameter set in the distortion correction parameter setting component 14. When a face does not exist in an image, the image warping component 15 does not perform distortion correction. In step S15, the image to which distortion correction was carried out in the image warping component 15 is recorded in storage 30.

Figure 8:
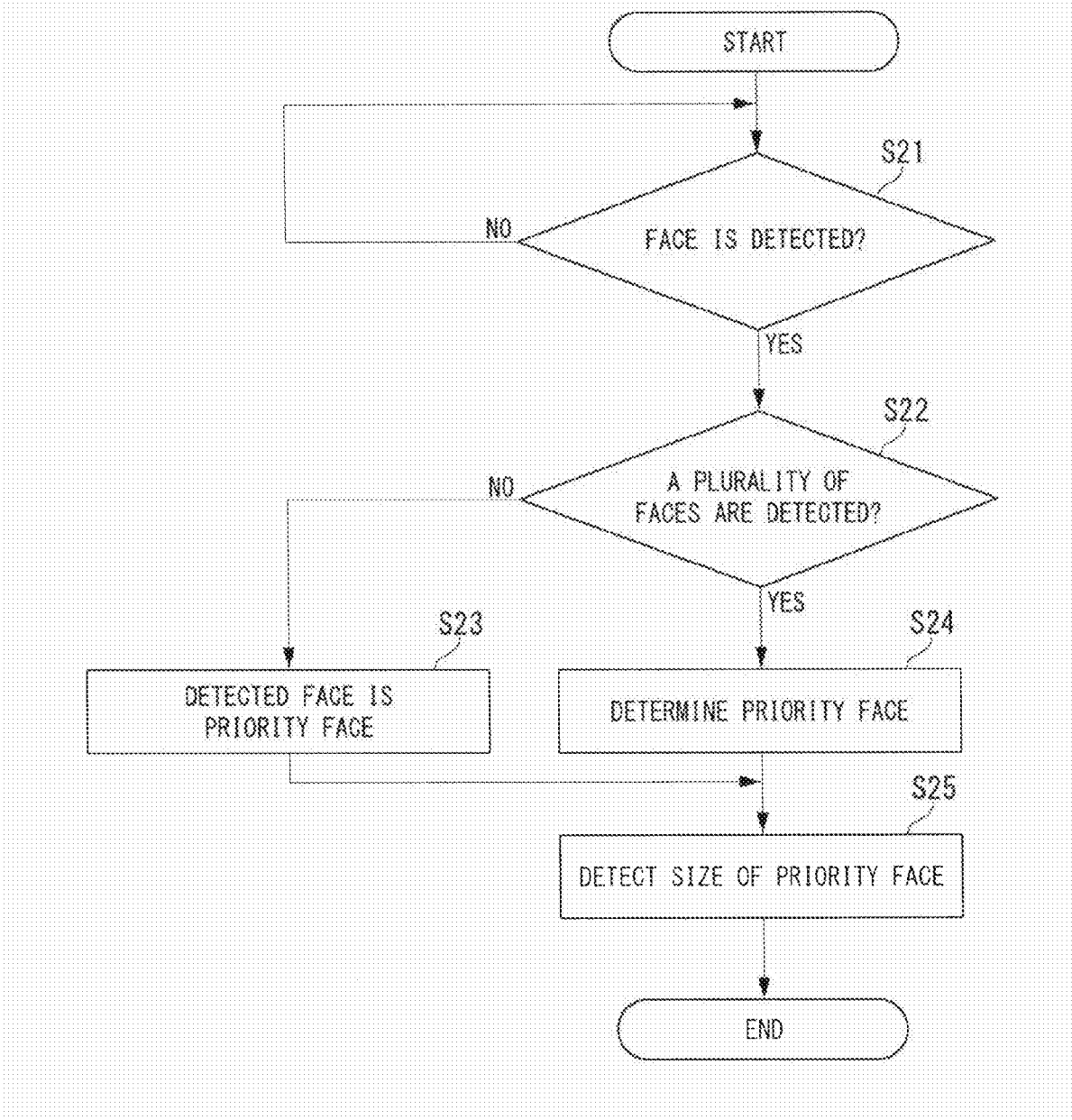
FIG. 8 is an exemplary algorithm illustrating a process in which the face detection component detects a priority face according to an embodiment.

FIG. 8 is an exemplary algorithm illustrating a process in which the face detection component 13 detects a priority face. In step S21, the face detection component 13 determines whether a face was detected from an image. If no face is detected (a "no" decision in step S21), the process waits until a face is detected. When a face is detected (a "yes" decision in step S21), the process continues to step S22, where it is determined whether a plurality of faces are detected. When only one face is detected, (a "no" decision in step S22), the process continues to step S23, where the face detection component 13 determines the one detected face as the priority face. When multiple faces are detected (a "yes" decision in step S22), the process moves from the face detection component 13 to step S24.

In step S24, the face detection component 13 determines one face within the multiple detected faces of the image as a priority face, based on pre-determined conditions. In an embodiment, the face detection component 13 can determine the largest face within the image as the priority face. In another embodiment, the face detection component 13 can determine the center face within the image as the priority face. Specific registered faces could also be designated as the priority face, such as the user's family face or an individual family member. In another embodiment, when a child priority mode is set, the face detection component 13 can determine a child's face as the priority face when multiple faces are present within the image. Multiple processes for determining priority faces can also be combined. For example, when two or more registered faces exist, the face detection component 13 can determine the face of the largest size as the priority face.

In step S25, the face detection component 13 detects the size of the determined priority faces from steps S23 and S24. For example, as illustrated in FIG. 2, when the upper right face f3 is a priority face in an image containing several faces, f1-f5, the face detection component 13 detects size SZ0 of face f3. Even though the height of face f3 was set to size SZ0 in the example illustrated in FIG. 2, numerical values other than the height of a face can be considered as a size.

FIG. 9 is a graph illustrating a correction parameter set in the distortion correction parameter setting component 14. The horizontal axis represents a size of a priority face and the vertical axis represents a strength of a deformation of the image after performing a distortion correction. An increase along the vertical axis direction signifies an increase in deformation strength. The broken line 50 illustrates the distortion strength of an original image. The distortion strength of the original image is determined by the lens of the camera, which is constant and is not related to a size of the face.

The correction parameter of the distortion correction parameter setting component 14 combines a distortion aberration correction, a spherical-surface projection correction, and a balance correction. An example is given for illustrative purposes. When a priority face is at a smallest size SZ1, a distortion aberration correction is performed. The strength of the deformation at this time is in a weak state. The distortion aberration correction SZ1 is weaker than the distortion strength of the original image 50. When a priority face is at a size SZ2, which is larger than SZ1, a spherical-surface projection correction is performed. The strength of the correction deformation is strong at this point, and the distortion correction is stronger than the distortion strength of the original image 50.

When a priority face is a size between size SZ1 and size SZ2, the size is tracked by generating intermediate parameters, which combine the distortion aberration correction and the spherical-surface projection correction. The distortion correction which varied the transmutation effect is performed. The strength of the transmutation effect changes to a curvilinear form in proportion to the change in size of the priority face, as illustrated in FIG. 9.

A balance correction is also performed when a priority face SZ3 is larger than size SZ2. The strength of the correction deformation is in a weak state, and the distortion correction is stronger than the distortion strength of the original image 50. When a priority face is a size between size SZ2 and size SZ3, the size is tracked. The intermediate parameter which combines a spherical-surface projection correction and a balance correction is generated for a correction. The distortion correction, which varies the transmutation effect is performed. The strength of the transmutation effect at this time is proportional to the change of a priority face size, as it changes to a curvilinear form.

For a priority face from the smallest size SZ1 to a certain size SZ2, the correction parameter shows a high deformation strength according to the size at the time it is set. For a priority face from size SZ2 to size SZ3, the correction parameter displays a weak deformation strength according to the size at the time it is set. However, the deformation strength at the largest size SZ3 becomes strong, unlike the deformation strength of the smallest size SZ1.

In the image warping component 15, a distortion correction for the size of the face uses a correction parameter set in the distortion correction parameter setting component 14. A correction parameter is expressed as a curve, which shows a relationship between the coordinate position of an output image and the coordinate position of an input image, as an example. Therefore, the image warping component 15 calculates the height of the image of the coordinate of an input pixel based on the height of the image of the coordinate of an output pixel. At this time, on the same radiation as an output pixel, the image warping component 15 calculates the coordinate used from the obtained image height, and carries out interpolation calculation using the same real pixel value of the periphery of it, wherein an output pixel value is obtained. This process is repeated with respect to the coordinate of all the output pixels of the range of a face. As a result, a warping process is performed using the image warping component 15.

Embodiments described above with reference to FIG. 9 illustrated linear interpolation between three parameters. In an alternative embodiment, the distortion correction parameter setting component 14 can have more than three parameters to obtain a correction parameter.

Figure 10A:
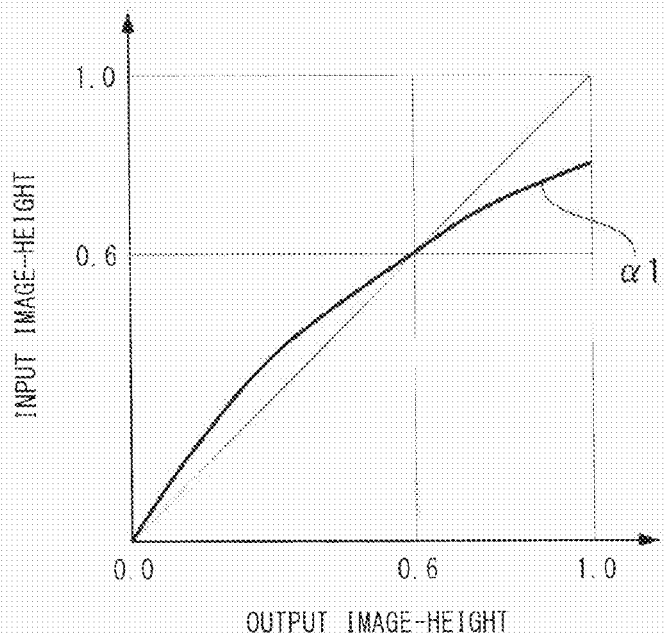
FIGS. 10A-10B illustrate a distortion aberration correction according to an embodiment.

A specific example will be given to illustrate a distortion aberration correction, a spherical-surface projection correction, and a balance correction with reference to FIGS. 10A-10B, 11A-11B, and 12A-12B, respectively. An original image with a barrel-type spherical aberration is illustrated. In addition, the aspect ratio of the width and the length of the original image is 4:3. FIG. 10A is a graph illustrating a distortion aberration correction of a correction parameter α1. The vertical axis of FIG. 10A illustrates the height of the input image of an original image and a horizontal axis illustrates the height of the output image of the image after a correction.

Figure 10B:
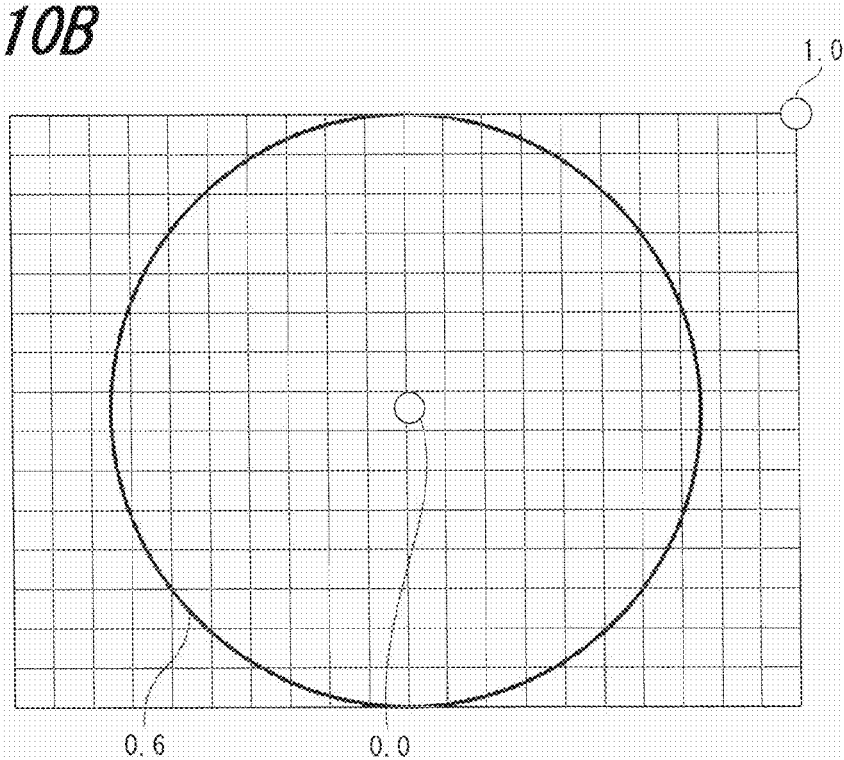

FIG. 10B is a graph illustrating the deformed state of an image when a distortion aberration correction is performed. The correction parameter α1 has a barrel-type distortion aberration correction in which a bow-shape protrudes upwards. Since the image has an aspect-ratio of 4:3, the location of the image height at 0.6 becomes an immobile point, wherein the output image height is equal to the input image height, 0.6. The concentric circle which passes along the vertically-centered point of the horizontal axis of ratio 4:3, results in the area inside the circle of the line at 0.6 with the same image height, wherein the input image height becomes higher than the output image height in a concentric-circle sagittal direction. As a result, the image in the vicinity of image height=0 is reduced. In contrast, in the area outside the circle shown in FIG. 10B, the input image height becomes lower than the output image height.

Figure 11A:
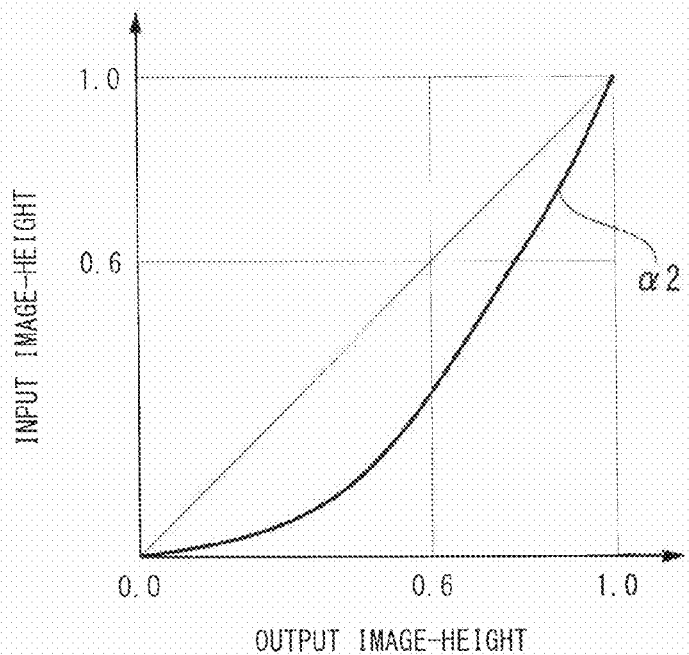
FIGS. 11A-11B illustrate a spherical-surface projection correction according to an embodiment.

FIG. 11A is a graph illustrating a correction parameter α2 of a spherical-surface projection correction. The vertical axis illustrates the height of the input image of an original image and the horizontal axis illustrates the height of the output image of the image after a correction.

Figure 11B:
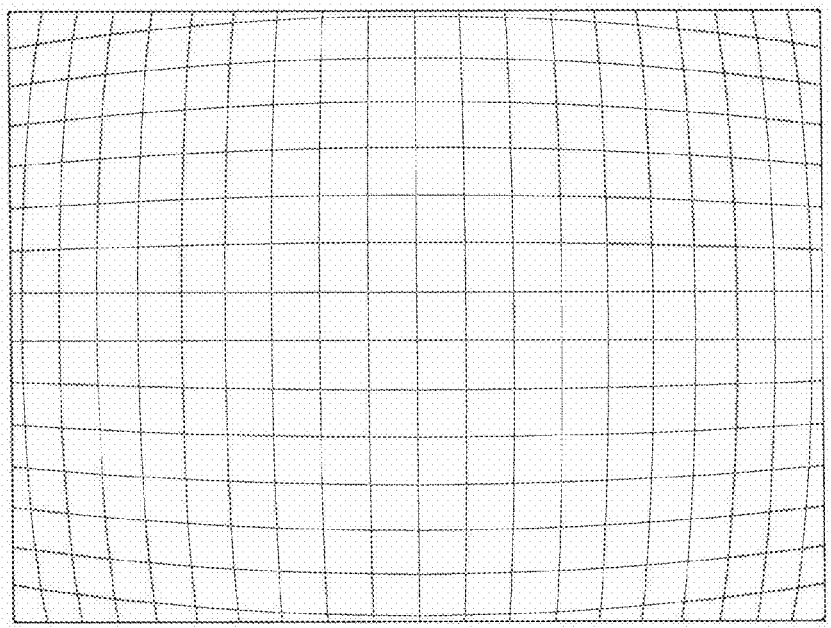

FIG. 11B is a graph illustrating the deformed state of the image when a spherical-surface projection correction is performed. The correction parameter α2 of a spherical-surface projection illustrates a curve protruding in a bow shape to the lower side, contrary to a distortion aberration correction. The correction of the direction which strengthens the barrel-type of an input image is performed more for this type of correction curve. A spherical-surface projection previously discussed with reference to FIG. 3B is realized using the correction factors described herein. The immobile points of FIG. 11B are at the four corners in which the image height is equal to 1.0, and the output image height becomes lower than the input image height in the entire area of the output image. Therefore, the image height in the vicinity equal to 0 is expanded, and the image height in the vicinity equal to 1.0 is reduced.

Figure 12A:
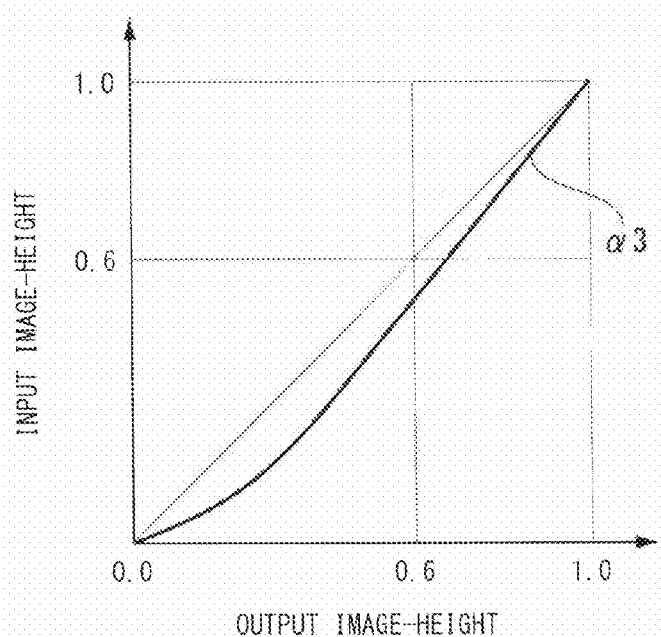
FIGS. 12A-12B illustrate a balance correction according to an embodiment.

FIG. 12A is a graph illustrating a correction parameter α3 of a balance correction. The vertical axis shows the height of the input image of an original image and the horizontal axis shows the height of the output image of the image after a correction.

Figure 12B:
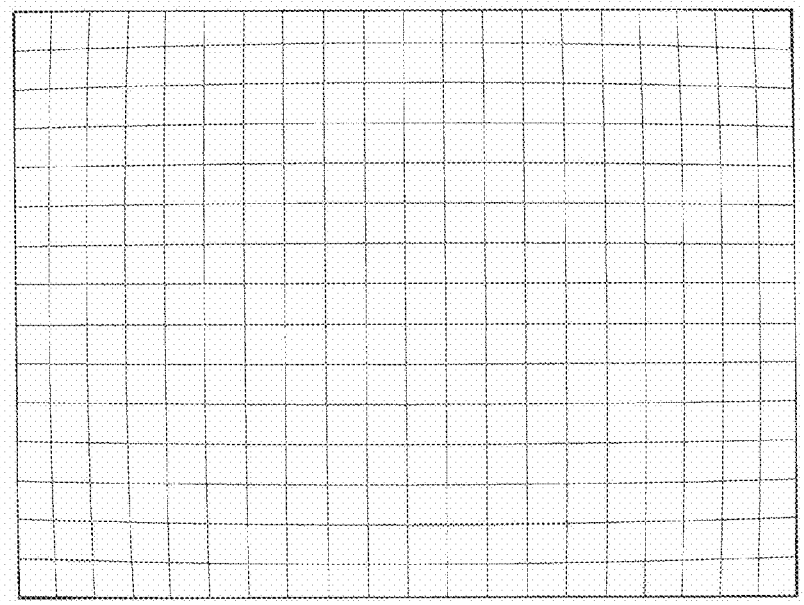

FIG. 12B is a graph illustrating the deformed state of an image when a balance correction is performed. Balance correction is the distortion correction parameter which weakened the spherical-surface projection effect when the size of a face is large. As illustrated, the curve which protruded downward slightly in a bow shape is drawn. The correction which strengthens the barrel-type of an input image results.

In the distortion correction parameter setting component 14, the intermediate parameter according to a size of a face is generated by interpolation, using the three parameters previously described with reference to FIGS. 10A-10B, 11A-11B, and 12A-12B. The image warping component 15 performs the warping process of an image using the generated intermediate parameter. By performing the warping process, the image warping component 15 can perform suitable wide-angle distortion correction in balance with a background, even when faces are of a different size or position, or a varying number of objects are present.

Figure 13:
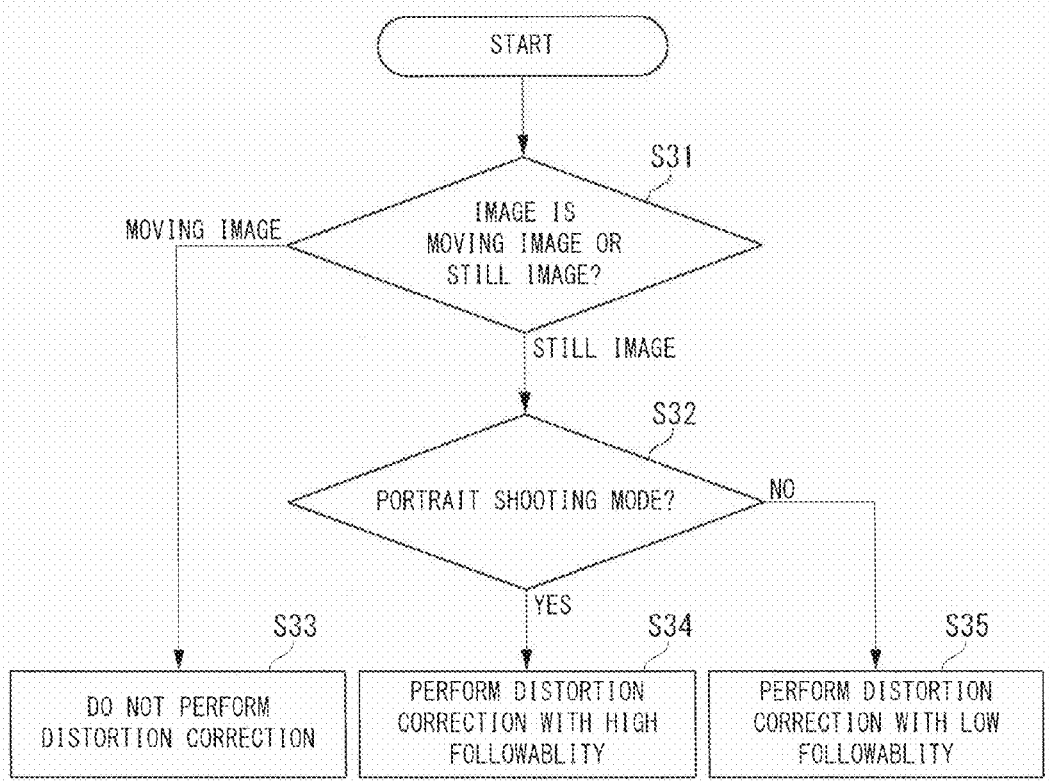
FIG. 13 is an exemplary algorithm for a distortion correction according to an embodiment.

FIG. 13 is an exemplary algorithm for a distortion correction changed by the operation mode, as executed by the image warping component 15. In step S31, the image warping component 15 determines whether the recording mode of a camera is a moving image mode or a still image mode. If the image is a moving image mode, the process proceeds to step S33. If the image is a still image mode, the process proceeds to step S32.

In step S32, it is determined whether the camera is in a portrait shooting mode. If the camera is in a portrait shooting mode (a "yes" decision in step S32), the process continues to step S34. If the camera is not in a portrait shooting mode, such as a scenery shooting mode (a "no" decision in step S32), the process continues to step S35.

In step S33, the image warping component 15 does not perform a distortion correction. Therefore, a distortion correction of a face is not performed in the case of a moving image mode.

In step S34, the image warping component 15 performs a distortion correction with a high followability, which is a correction from which strength changes are illustrated by an associated curve, such as illustrated in FIG. 9. In the case of a portrait shooting mode of a still image, appropriate distortion corrections are made according to the size of the face.

In step S35, the image warping component 15 performs a distortion correction with a low followability, which has a weak strength at the time of each face size, rather than the correction performed by the curve illustrated in FIG. 9, for example.

Using embodiments described herein, a distortion correction is only performed on a still image. Therefore, the background of the portrait face is not distorted at the time of recording a moving image. When recording a still image, the distortion of the face contained within the still image is removed by appropriate strength, and a still image of high quality is obtained. The distortion correction state suitable for each mode is acquired by switching the mode in which a distortion correction is performed by setting the mode to a portrait shooting mode or another mode.

FIG. 14 is a block diagram illustrating an exemplary user device according to certain embodiments of the present disclosure. In certain embodiments, user device 100 may be a smartphone. However, the skilled artisan will appreciate that the features described herein may be adapted to be implemented on other devices (e.g., a laptop, a tablet, a server, an e-reader, a camera, a navigation device, etc.). The exemplary user device 100 of FIG. 14 includes a controller 110 and a wireless communication processor 102 connected to an antenna 101. A speaker 104 and a microphone 105 are connected to a voice processor 103.

The controller 110 is an example of a control unit of a camera, a video camera, a digital still camera, a smart phone, or a tablet illustrated in FIG. 6 and may include one or more Central Processing Units (CPUs), and may control each element in the user device 100 to perform functions related to communication control, audio signal processing, control for the audio signal processing, still and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network or on a non-transitory computer readable medium. As described above with reference to FIG. 6, the controller 110 can execute instructions allowing the controller 110 to function as the image capture component 12, the face detector component 13, the distortion correcting parameter setting component 14, and the image warping component 15.

The memory 150 is an example of the memory 20 and storage unit 30 in FIG. 6 and includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto. As described above with reference to FIG. 6, the memory 150 can be configured to store the image data captured by the image capture component 12 and stored by the image storage component 21. The distortion correction parameter for performing distortion correction of an image is stored by the parameter storage component 22 of the memory 20.

The user device 100 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the user device 100 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals obtained by the microphone 105.

The exemplary user device 100 may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons which may be used for control of the user device 100. The display 120 may additionally display a GUI for a user to control aspects of the user device 100 and/or other devices. Further, the display 120 may display characters and images received by the user device 100 and/or stored in the memory 150 or accessed from an external device on a network. For example, the user device 100 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

One or more of the display 120 and the touch panel 130 are examples of the monitor 16 depicted in FIG. 6 and described above.

In certain aspects of the present disclosure, the touch panel 130 may be disposed adjacent to the display 120 (e.g., laminated) or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure may easily be applied to other touch panel types (e.g., resistance-type touch panels) with alternate structures.

In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g. in response to a detection of a touch operation, in response to a query from another element based on timed data exchange, etc.

The touch panel 130 and the display 120 may be surrounded by a protective casing, which may also enclose the other elements included in the user device 100. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 110 may be configured to detect which hand is holding the user device 100, based on the detected finger position. For example, the touch panel 130 sensors may detect a plurality of fingers on the left side of the user device 100 (e.g., on an edge of the display 120 or on the protective casing), and detect a single finger on the right side of the user device 100. In this exemplary scenario, the controller 110 may determine that the user is holding the user device 100 with his/her right hand because the detected grip pattern corresponds to an expected pattern when the user device 100 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the user device 100 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The user device 100 may include a motion sensor 108. The motion sensor 108 may detect features of motion (i.e., one or more movements) of the user device 100. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the user device 100. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the user device 100 (e.g., a jarring, hitting, etc., of the user device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the terminal device 100. The information of the present position detected by the GPS section 160 is transmitted to the controller 110. An antenna 161 is connected to the GPS section 160 for receiving and transmitting signals to and from a GPS satellite.

The user device 100 may include a camera section 109, which includes a lens and shutter for capturing photographs of the surroundings around the user device 100. In an embodiment, the camera section 109 captures surroundings of an opposite side of the user device 100 from the user. The images of the captured photographs can be displayed on the display panel 120. A memory section saves the captured photographs. The memory section may reside within the camera section 109 or it may be part of the memory 150. The camera section 109 can be a separate feature attached to the user device 100 or it can be a built-in camera feature.

Numerous modifications and variations of the present invention are possible in light of the above teachings. The embodiments described with reference to the drawings may be practiced individually or in any combination thereof. It is therefore to be understood that within the scope of the appended claims, the embodiments may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It is noted that, as used in the specification and the appended claims, the singular forms "a," "an," and "the" include plural referents unless the context clearly dictates otherwise.

The above disclosure also encompasses the embodiments noted below.

(1) An electronic device comprising circuitry configured to detect a size of a face from a captured image, identify a distortion correction parameter which varies according to a size of the detected face, and correct a distortion of the face within the captured image by utilizing the distortion correction parameter identified based on the size of the detected face from the captured image.

(2) The electronic device according to (1), wherein a distortion correction pattern of the image warping component strengthens a warping effect when the size of the face increases from a first smaller size to a second larger size, and the distortion correction pattern of the image warping component weakens a warping effect when the size of the face increases from the second larger size to a third larger size.

(3) The electronic device according to (1) or (2), wherein the face detector component determines a high priority face from a plurality of faces within the captured image based upon a size of the face.

(4) The electronic device according to any one of (1) to (3), wherein the face detector component determines a high priority face from a plurality of faces within the captured image based upon a size of the face.

(5) The electronic device according to any one of (1) to (4), wherein the warping component corrects a distortion of the face in a portrait shooting mode for a still image.

(6) The electronic device according to any one of (1) to (5), wherein the distortion is corrected with respect to a change of the size of the face.

(7) The electronic device according to any one of (1) to (6), wherein the distortion is corrected with a high followability when the captured image is a still image in a portrait shooting mode.

(8) The electronic device according to any one of (1) to (7), wherein the distortion correction parameter is established on one or more correction bases of a distortion aberration correction, a spherical projection correction, and a balance correction.

(9) The electronic device according to any one of (1) to (8), wherein the distortion aberration correction is utilized for a first smaller sized face and the spherical projection correction is utilized for a second larger sized face.

(10) The electronic device according to any one of (1) to (9), wherein interpolation determines the distortion correction parameter between the first smaller sized face and the second larger sized face.

(11) The electronic device according to any one of (1) to (10), wherein a deformation strength increases in proportion from the first smaller sized face to the second larger sized face.

(12) The electronic device according to any one of (1) to (11), wherein the spherical projection correction is utilized at a second larger sized face and the balance correction is utilized at a third larger sized face.

(13) The electronic device according to any one of (1) to (12), wherein interpolation determines the distortion correction parameter between the second larger sized face and the third larger sized face.

(14) The electronic device according to any one of (1) to (13), wherein a deformation strength decreases in proportion from the second larger sized face to the third larger sized face.

(15) The electronic device according to any one of (1) to (14), wherein the distortion is corrected by adjusting an imaging surface of a projected plane.

(16) The electronic device according to any one of (1) to (15), wherein a corrected image height h' is calculated as h'=f arc tangent(h/f), wherein f is equal to a focal distance of a lens and h is equal to an original image height.

(17) The electronic device according to any one of (1) to (16), wherein the imaging surface of the projected plane is corrected to a spherical projected plane for one or more spherical objects of the captured image.

(18) A method of correcting an image of a user device includes detecting from a captured image, a size of a facial image according to a set of pre-determined conditions via circuitry of a face detection component; setting a distortion correction parameter which varies according to the size of the detected facial image via circuitry of a distortion correction parameter setting component; and correcting a distortion of the facial image of the captured image using the distortion correction parameter set via circuitry of the distortion correction parameter setting component.

(19) A non-transitory computer-readable storage medium having computer-readable instructions embodied thereon, that when executed by a computing device, executes a method comprising detecting from a captured image, a size of a facial image according to a set of pre-determined conditions via a face detection component; setting a distortion correction parameter which varies according to the size of the detected facial image via a distortion correction parameter setting component; and correcting a distortion of the facial image of the captured image using the distortion correction parameter set in the distortion correction parameter setting component.

The invention claimed is:

1. An electronic device, comprising:
  circuitry configured to
    detect a size of a face from a captured image;
    identify a distortion correction parameter which varies according to a size of the detected face; and
    correct a distortion of the face within the captured image by utilizing the distortion correction parameter identified based on the size of the detected face from the captured image,
    wherein a distortion correction pattern strengthens a warping effect when the size of the face increases from a first smaller size to a second larger size, and the distortion correction pattern weakens a warping effect when the size of the face increases from the second larger size to a third larger size.

2. The electronic device of claim 1, wherein a face detector component determines a high priority face from a plurality of faces within the captured image based upon the size of the face.

3. The electronic device of claim 2, wherein the high priority face is determined as a largest size of face from the plurality of faces within the captured image.

4. The electronic device of claim 1, wherein a warping component corrects a distortion of the face in a portrait shooting mode for a still image.

5. The electronic device of claim 4, wherein the distortion is corrected with respect to a change of the size of the face.

6. The electronic device of claim 5, wherein the distortion is corrected with a high followability when the captured image is a still image in a portrait shooting mode.

7. The electronic device of claim 1, wherein the distortion correction parameter is established on one or more correction bases of a distortion aberration correction, a spherical projection correction, and a balance correction.

8. The electronic device of claim 7, wherein the distortion aberration correction is utilized for a first smaller sized face and the spherical projection correction is utilized for a second larger sized face.

9. The electronic device of claim 8, wherein interpolation determines the distortion correction parameter between the first smaller sized face and the second larger sized face.

10. The electronic device of claim 9, wherein a deformation strength increases in proportion from the first smaller sized face to the second larger sized face.

11. The electronic device of claim 7, wherein the spherical projection correction is utilized at a second larger sized face and the balance correction is utilized at a third larger sized face.

12. The electronic device of claim 11, wherein interpolation determines the distortion correction parameter between the second larger sized face and the third larger sized face.

13. The electronic device of claim 12, wherein a deformation strength decreases in proportion from the second larger sized face to the third larger sized face.

14. The electronic device of claim 1, wherein the distortion is corrected by adjusting an imaging surface of a projected plane.

15. A method of correcting an image of a user device, the method comprising:
   detecting from a captured image, a size of a facial image according to a set of pre-determined conditions via circuitry of a face detection component;
   setting a distortion correction parameter which varies according to the size of the detected facial image via circuitry of a distortion correction parameter setting component; and
   correcting a distortion of the facial image of the captured image using the distortion correction parameter via circuitry of the distortion correction parameter setting component,
   wherein a distortion correction pattern strengthens a warping effect when the size of the facial image increases from a first smaller size to a second larger size, and the distortion correction pattern weakens a warping effect when the size of the facial image increases from the second larger size to a third larger size.

16. An electronic device, comprising:
   circuitry configured to
   detect a size of a face from a captured image;
   identify a distortion correction parameter which varies according to a size of the detected face; and
   correct a distortion of the face within the captured image by utilizing the distortion correction parameter identified based on the size of the detected face from the captured image,
   wherein the distortion is corrected by adjusting an imaging surface of a projected plane, and a corrected image height h' is calculated as h'=f arctangent(h/f), wherein f is equal to a focal distance of a lens and h is equal to an original image height.

17. The electronic device of claim 16, wherein the imaging surface of the projected plane is corrected to a spherical projected plane for one or more spherical objects of the captured image.

* * * * *